United States Patent [19]

Tawil

[11] Patent Number: 5,483,663
[45] Date of Patent: Jan. 9, 1996

[54] SYSTEM FOR PROVIDING LOCAL ORIGINATING SIGNALS WITH DIRECT BROADCAST SATELLITE TELEVISION SIGNALS

[75] Inventor: Saleem Tawil, Austin, Tex.

[73] Assignee: Diversified Communication Engineering, Inc., Austin, Tex.

[21] Appl. No.: 222,896

[22] Filed: Apr. 5, 1994

[51] Int. Cl.$^6$ ..................................................... H04H 1/00
[52] U.S. Cl. .................................. 455/3.2; 348/20; 348/6; 455/180.1
[58] Field of Search .................................. 455/3.2, 188.1, 455/180.1, 20; 348/470, 21, 6, 12, 13; H04N 7/20

[56]         References Cited

U.S. PATENT DOCUMENTS

| | | |
|---|---|---|
| D. 195,261 | 5/1963 | McAuley . |
| D. 196,050 | 8/1963 | Finke et al. . |
| D. 275,197 | 8/1984 | Feagle . |
| D. 304,337 | 10/1989 | Tai . |
| D. 305,766 | 1/1990 | Tai . |
| D. 306,862 | 3/1990 | Kent . |
| 2,653,323 | 10/1945 | Bainbridge . |
| 4,097,708 | 1/1978 | Bickel .................................. 219/10.55 |
| 4,198,639 | 4/1980 | Killion . |
| 4,630,108 | 12/1986 | Gomersall .................................. 358/84 |
| 5,038,151 | 8/1991 | Kaminski . |
| 5,041,840 | 8/1991 | Cipolla et al. . |
| 5,115,463 | 5/1992 | Moldavsky et al. .................... 379/58 |
| 5,125,109 | 6/1992 | Geller et al. ......................... 455/313 |
| 5,276,904 | 1/1994 | Mutzig et al. ......................... 455/3.2 |
| 5,374,938 | 12/1994 | Hatazawa et al. ...................... 343/756 |

FOREIGN PATENT DOCUMENTS

| | | |
|---|---|---|
| 025739 | 3/1981 | European Pat. Off. . |
| 1221694 | 7/1961 | Germany . |
| 1953595 | 10/1969 | Germany . |
| 57-154909 | 9/1982 | Japan . |
| 4411486 | 1/1992 | Japan .............................. H04N 7/20 |
| 2249668 | 6/1990 | United Kingdom . |

Primary Examiner—Victor R. Kostak
Assistant Examiner—Juan Gabriel Acosta
Attorney, Agent, or Firm—Russell D. Culbertson; Shaffer & Culbertson

[57]         ABSTRACT

An apparatus for providing local programming with direct broadcast satellite transmissions includes a terrestrial transmitter for transmitting converted local channel signals in a first frequency band. The first frequency band is contained within a satellite broadcast frequency band in which the direct broadcast satellite channels are transmitted. The apparatus also includes at each user or subscriber location, a first antenna for receiving the converted local channel signals from the terrestrial transmitter and a second antenna for receiving a direct broadcast satellite channel signals from the satellite. The apparatus further includes a combiner for combining the converted local channel signals and the direct broadcast satellite channel signals on a single propagation path. A signal processor/decoder processes the combined signals on the single propagation path to produce a desired channel output to drive a television set. To the processor/decoder the combined channel signal appears as if it had been all broadcast directly from the satellite. Therefore, the apparatus requires no additional receiver for receiving local programming along with regional and national programming provided by satellite transmission.

21 Claims, 3 Drawing Sheets

SYSTEM FOR PROVIDING LOCAL ORIGINATING SIGNALS WITH DIRECT BROADCAST SATELLITE TELEVISION SIGNALS

BACKGROUND OF THE INVENTION

This invention relates to apparatus and methods for broadcasting and receiving television signals. More particularly, this invention relates to an apparatus and method for providing local originating channels along with direct broadcast satellite television channels transmitted from a satellite.

Television signals may be received from a satellite in geosynchronous orbit in which it is stationary with respect to a geographic receiving area. Typically, the television signals are transmitted from a terrestrial transmitter to the satellite and then retransmitted from the satellite so that the signals can be received by terrestrial receivers within the geographic receiving area, that is, within a line of sight of the satellite.

Direct broadcast satellite service ("DBS") refers to satellite transmission of television signals directly for use by individual households or subscribers having the proper signal receiving equipment. The U.S. Federal Communications Commission has dedicated the electromagnetic spectrum from 12.2 Giga-Hertz to 12.7 Giga-Hertz for DBS broadcasting. Sixteen signal carriers are located within the DBS spectrum, each carrier carrying several individual television channels. Depending upon the compression technology applied to these signals, literally hundreds of separate channels may be available through DBS. A great benefit of the DBS system as opposed to prior satellite systems is that only a small dish-type antenna is required to receive the DBS signals and the alignment of the receiving dish is not critical. Also, the DBS system will provide high quality reception at any point in the geographic receiving area of a satellite without the expense of land transmission lines such as those required for cable television.

The DBS system requires that a subscriber purchase or rent both a special DBS signal processing unit or receiver and a DBS satellite signal receiving antenna. The receiver and antenna are usually provided as one assembly having an outdoor unit and an indoor unit. The special DBS receiver receives all sixteen carriers and includes channel selecting logic for selecting a desired program channel from the received carriers. To produce a single channel program output to a television set, the DBS receiver channel selecting logic selects one of the sixteen carriers and then demodulates and decodes the encoded signals. Finally the receiver converts the desired channel signal from digital form to analog form to provide the channel input to the television set.

A major problem with the DBS system involves local originating programming or television channels. Since a single DBS satellite transmits to substantially an entire continent, DBS can effectively only provide national or at most regional programming. There is simply not enough room in the DBS spectrum for all local originating programming to be transmitted through the satellite for selection by individual subscribers. Rather, DBS subscribers must obtain local originating programming from other sources such as local broadcast stations, cable, or local wireless sources. These separate sources all require separate receiving equipment. Furthermore, the advantages of DBS are less attractive to potential subscribers because the subscribers must also use a separate system, cable for example, in order to obtain local programming. In fact, there has been great concern that the absence of local programming with DBS may make the DBS system commercially unviable.

SUMMARY OF THE INVENTION

It is therefore a general object of the invention to overcome the above described problems and limitations associated with DBS systems. Particularly, it is an object of the invention to provide an apparatus and method for providing local originating channels along with direct broadcast satellite television channels transmitted from a satellite.

To accomplish this object, a system according to the invention utilizes a terrestrial transmitter to transmit local programming or local channel signals within the frequency band of the DBS satellite transmissions and digitally encoded in a similar fashion. Part of the DBS broadcasting spectrum may be withdrawn from satellite transmission use and instead dedicated for use with local channel signals transmitted from the terrestrial transmitter. Since the terrestrial transmitter has limited range, the same local channel portion of the DBS spectrum dedicated for use with local channel signals may be reused in different geographical areas without interference. In this fashion, DBS subscribers in the entire DBS range are provided with desired local programming without the need of a separate receiver and without having to subscribe to a separate local service provider.

In addition to the terrestrial transmitter and the DBS satellite transmitter, the apparatus according to the invention includes special receiving equipment at each location subscribing to the DBS system. The receiving equipment includes an antenna structure for receiving signals from both the terrestrial transmitter and the satellite transmitter, combining means for combining the signals received by the two antennas, and the regular DBS receiver or signal processing means.

The terrestrial transmitter, located at a terrestrial transmitting location, transmits local channel signals in a frequency band that is included in the band allotted for satellite broadcasting. Preferably the terrestrial transmitter receives local channel signals broadcast locally by some means and then converts the local channel signals from their broadcast frequencies to converted local channel signals in a first frequency band such that they are compatible with the satellite broadcast signals. The first frequency band is contained within a satellite broadcast frequency band which may be the band that DBS has been allotted. In the DBS system, the satellite broadcast frequency band has an approximate lower frequency limit of 12.2 Giga-Hertz and an approximate upper frequency limit of 12.7 GigaHertz. Although more or less of the DBS spectrum may be used for local channel signals, approximately ten percent (10%) of the satellite broadcast frequency band will preferably be vacated for the converted local channel signals. The converted local channel signals could also be transmitted at higher or lower frequencies adjacent to the DBS frequency spectrum.

The antenna structure according to the invention is located at a user location remote from the terrestrial broadcasting location and includes a first antenna and a second antenna. The first antenna is adapted to receive the converted local channel signals in the first frequency band. The second antenna is adapted for receiving direct broadcast satellite television channel signals that are transmitted by the satellite in the satellite broadcast frequency band. Preferably, the first and second antennas are located on a single structure and are separately alignable for peak reception. However, the first and second antennas could also be separate if required for peak reception. Any antennas suitable for receiving the respective frequency signals may be used in the antenna structure according to the invention.

The combining means is also located at the user location and operates to combine the converted local channel signals received by the first antenna and the direct broadcast satellite television signals received by the second antenna. The combining means combines the two sets of signals to form a combined television signal travelling on a single propagation path. Since the individual signals are each within the satellite broadcast frequency band, the combined television signal is also in the satellite broadcast frequency band and may be processed for use as if it were from a single source. When applied to the DBS system for example, the combined signal may be processed by a single DBS receiver without the need for additional or alternative equipment.

The signal processing means or receiver receives the combined television signal from the combining means and processes the combined signal to produce a desired channel output signal to a television set. In the DBS system for example, the signal processing receiver is implemented in a single piece of equipment and includes bandpass filters for filtering the incoming signal and an amplifier. The receiver also includes a mixer, demodulator, digital decoder, and a digital to analog converter all controlled by channel selector/control logic.

The present invention in combination with the DBS system provides a superior alternative to cable television systems. The subscriber not only obtains the high quality reception available with DBS but also obtains local programming without having to subscribe to a separate service or obtain additional receiving equipment.

These and other objects, advantages, and features of the invention will be apparent from the following description of the preferred embodiments, considered along with the accompanying drawings.

DESCRIPTION OF THE PREFERRED EMBODIMENT

Figure 1:
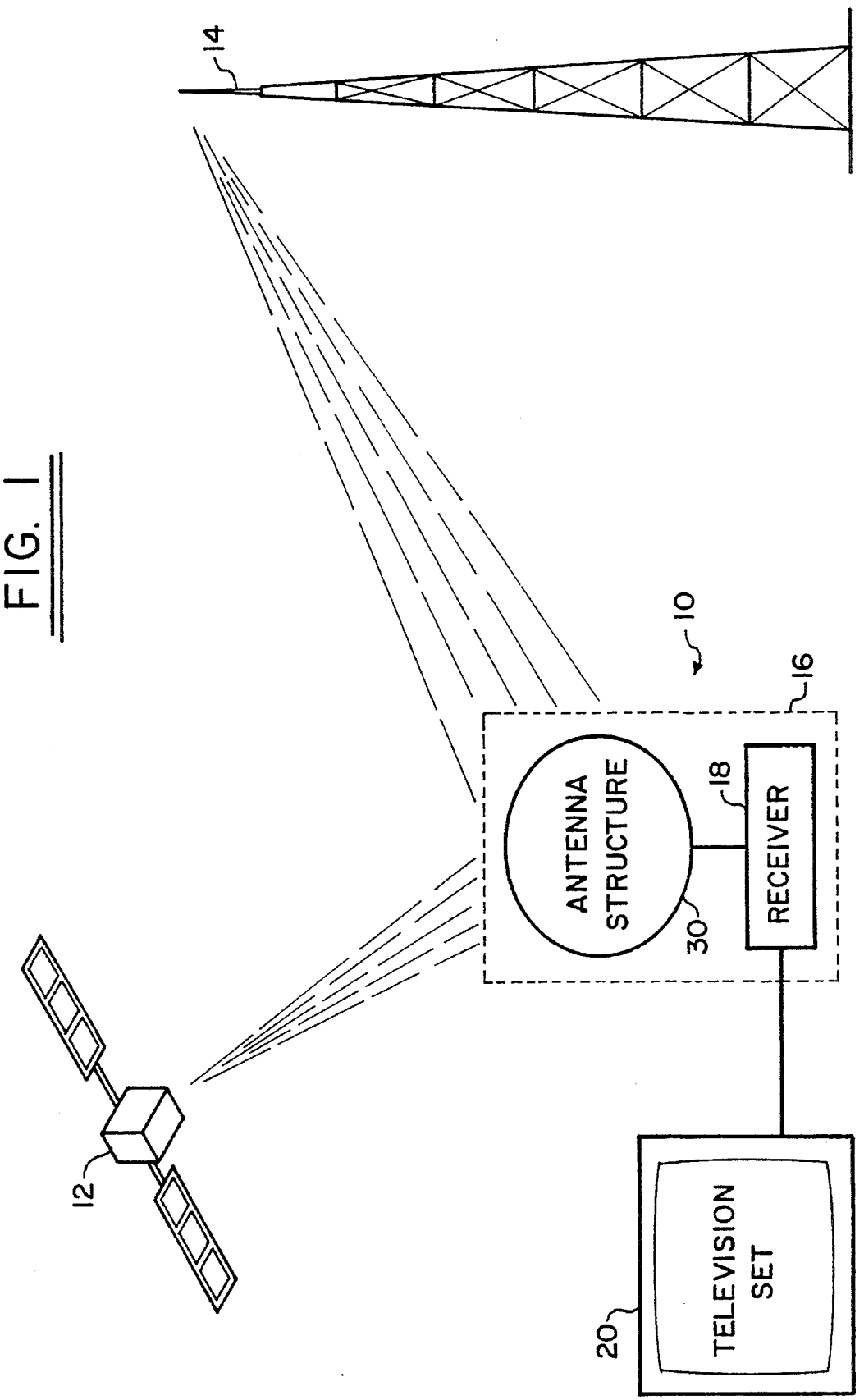
FIG. 1 is a diagrammatic view of a transmitting and receiving apparatus embodying the principles of the present invention.

FIGS. 1–4 illustrate one preferred apparatus 10 for providing local programming or channels along with direct broadcast satellite television channels according to the invention. The apparatus 10, as shown FIG. 1, is adapted to be used with a satellite transmitter 12 broadcasting direct broadcast satellite television signals in a satellite broadcast frequency band. The apparatus 10 includes a terrestrial transmitter 14 and a signal receiving arrangement 16 located at a location remote from the terrestrial transmitter. Each individual user or subscriber of the service would have a signal receiving arrangement. The terrestrial transmitter 14 transmits in a frequency band within the satellite frequency band and the receiving arrangement 16 receives the satellite signals and the terrestrial signals and combines them for processing by a single receiver 18. The disclosed system 10 provides DBS along with local programming while requiring no additional receiving equipment other than a special antenna structure described below and means for combining the separate direct broadcast satellite television channel signals and local channel signals.

The DBS satellite 12, as is well known in the field, includes a transmitter (not shown) and is located in a geosynchronous orbit so that it remains stationary with respect to a certain geographic broadcast area. The satellite 12 itself receives signals from a land-based transmitter (not shown) and then retransmits those signals back to earth. The position of the satellite transmitter 12 allows it to provide a clear signal to a large geographic area. The satellite transmits in a satellite broadcast frequency band. For example, the FCC has allocated the electromagnetic spectrum band from 12.2 Giga-Hertz to 12.7 Giga-Hertz for DBS broadcasting and this frequency band represents the preferred satellite broadcast frequency band. However, the satellite broadcast frequency band for purposes of this invention could also be defined as a frequency band in which the single receiver is adapted to operate. For example, the satellite frequency band could be defined to encompass a frequency band adjacent to the DBS band as well as the allocated DBS band with the terrestrial signal being transmitted in this adjacent band. In this fashion, the invention could be adapted to operate over any desired frequency band.

The terrestrial transmitter 14 comprises any suitable transmitting device for transmitting local channel signals in a first frequency band that is contained within the satellite frequency band. The terrestrial transmitter 14 provides local programming with the local channel signals. Preferably, the terrestrial transmitter 14 will have associated with it means for receiving local programming and signal converting means (not shown) for converting the received local signals into converted local channel signals in the first frequency band. The receiver for the terrestrial transmitter and the signal converter are known in the art and are not described further herein. In a preferred embodiment of the invention operable for DBS systems, the local signals are converted from analog to digital signals before they are transmitted so that the DBS receiver 18 may decode the terrestrially transmitted signals similarly to the satellite transmitted signals.

The terrestrial transmitter 14 has limited range depending upon its broadcast power. For example, depending upon the terrain surrounding the terrestrial transmitter 14, a 100 Watt transmitter can provide a suitable signal for approximately a ten-mile radius around the transmitter. The broadcast power for the terrestrial transmitter is chosen to provide the desired local coverage. Also, since the terrestrial transmitters each have a limited range, the invention encompasses many separate terrestrial transmitters at different geographical locations around the satellite broadcast area for providing the converted local channel signals in just their respective local areas. Since the broadcasting range is limited geographically, each terrestrial transmitter 14 may broadcast in the same first frequency band without providing conflicting signals to any subscriber. Further, in high population density areas when many local channels operate, such as New York City and Los Angeles, for example, the first frequency spectrum could be subdivided to allow portions of the first frequency spectrum to be reused more frequently than other portions of the spectrum. In this fashion, some local channels could be broadcast over a larger area while other local channels could be broadcast over smaller area, depending upon local demand for the channels.

The receiving arrangement 16 is located at a remote location from the location of the terrestrial transmitter 14, such as at an individual household within the range of the terrestrial transmitter. The receiving arrangement 16 includes an antenna structure 30 and the receiver 18, and provides a standard television signal to drive a user or subscriber's television set. The receiving arrangement 16 is adapted to receive the direct broadcast satellite channel signals containing regional or national programming and also the converted local channel signals containing local programming.

Figure 2:
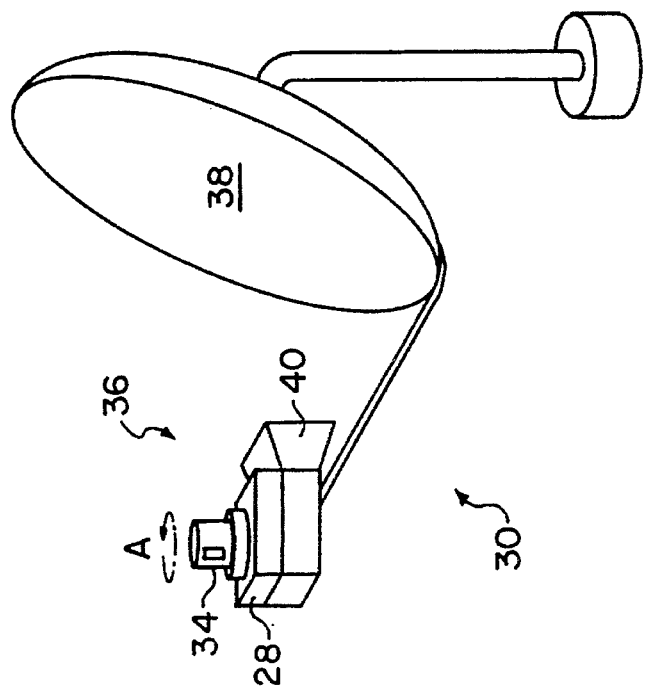
FIG. 2 is an isometric drawing of an antenna structure embodying the principles of the invention.

Referring to FIG. 2, the antenna structure 30 includes a first antenna 34 for receiving converted local channel signals and a second antenna 36 for receiving direct broadcast satellite signals. The antenna structure 30 also preferably includes a low noise block converter ("LNB") 28 for conditioning the signals from both antennas as described more particularly with reference to FIG. 3. The second antenna 36, as shown in FIG. 2, preferably comprises a standard satellite signal receiving antenna with a reflector dish 38 and a feed-horn assembly 40. The reflector dish 38 reflects and concentrates signals to the feed-horn assembly 40 and these signals are picked up by an antenna probe 42 (FIG. 3) associated with the feed-horn assembly. The first antenna 34 (shown in FIG. 2) preferably comprises a monopole slot antenna. The slot antenna feeds its signal to the LNB 28 through any suitable connection such as a low loss copper coaxial cable 32 (FIG. 3) directly connected to the LNB. Also, the illustrated slot antenna is rotatably mounted on the satellite antenna feed-horn assembly so that it may rotate about its longitudinal axis as shown at arrow A to best position its slot, or slots if more than one is used, for receiving convened local channel signals from the local terrestrial transmitter 14.

Those skilled in the art will readily appreciate that the size of the LNB 28, feed-horn 40 and slot antennal is exaggerated in FIG. 2 relative to the reflector dish for purposes of illustration. In actuality, the reflector dish may be about 18 inches in diameter, the feed-horn 40 wave guide is rectangular approximately one inch wide and one-half inch high, the LNB is rectangular one-half inch high and two and one-half inches long, and the slot antenna for a low gain unit is approximately one inch high and one-half inch in diameter with the slot being about half an inch long.

Figure 3:
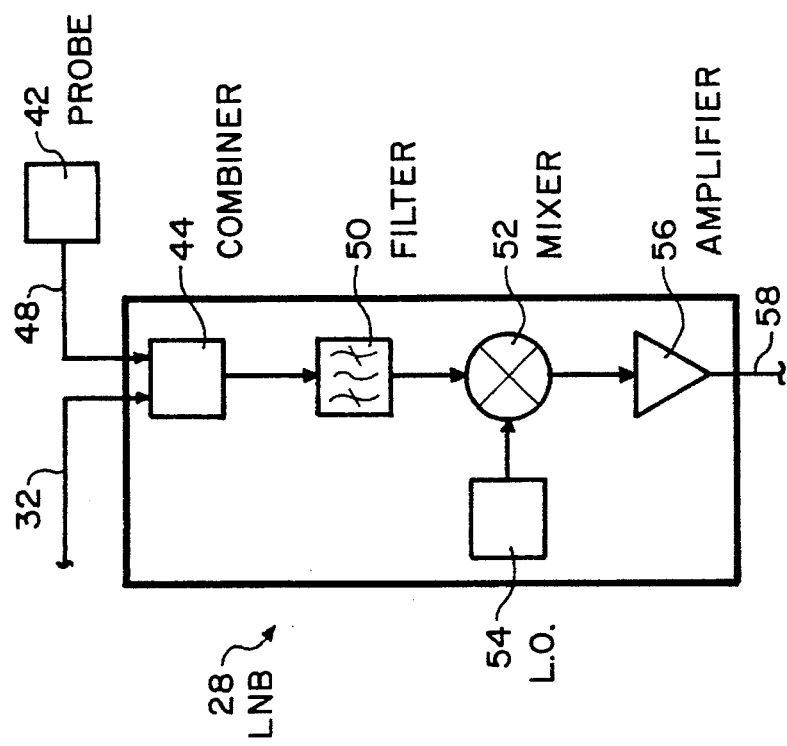
FIG. 3 is a diagrammatic representation showing a signal combiner according to the invention.

Referring to FIG. 3, the preferred LNB 28 includes integrally formed combining means 44 for combining the local channel signals and the direct broadcast satellite channel signals on a single propagation path. The combining means 44 in this preferred form of the invention comprises a stripline combiner connected to receive signals from the transmission line 32 connected to the first antenna 34 and the transmission line 48 connected to the probe 42. The stripline combiner 44, such as that shown diagrammatically in FIG. 3, is well known in the art and includes a conductor having dimensions dictated by the frequencies of signals which it carries. Both the transmission line 32 from the slot antenna 34 and the transmission line 48 from the probe 42 may comprise coaxial cable cut to an appropriate length. In a particular embodiment, the length of the coaxial cable may be dictated by the respective impedances of the slot antenna 34 and the probe 42 so that impedances at the combiner are properly matched.

Although the stripline combiner 44 is shown in FIG. 3 as the preferred form of the invention, any suitable combining means may be used within the scope of the invention. For example, a directional coupler (not shown) may be used to couple the signals from the slot antenna 34 onto a transmission line carrying signals from the satellite antenna. Also, the LNB 28 may be integrally formed with the feed-horn antenna probe 42 and the propagation path from the antenna probe to the stripline combiner 44.

The illustrated preferred LNB 28 also preferably includes a band pass filter 50, a mixer 52 controlled by a local oscillator 54, and an amplifier 56. The LNB 28 functions to filter the combined signals and to translate the combined signals into an intermediate frequency band. The LNB 28 also functions to amplify the signals for transmission by suitable transmission line 58 to the DBS broadcast receiver/decoder 18 for further processing.

Figure 4:
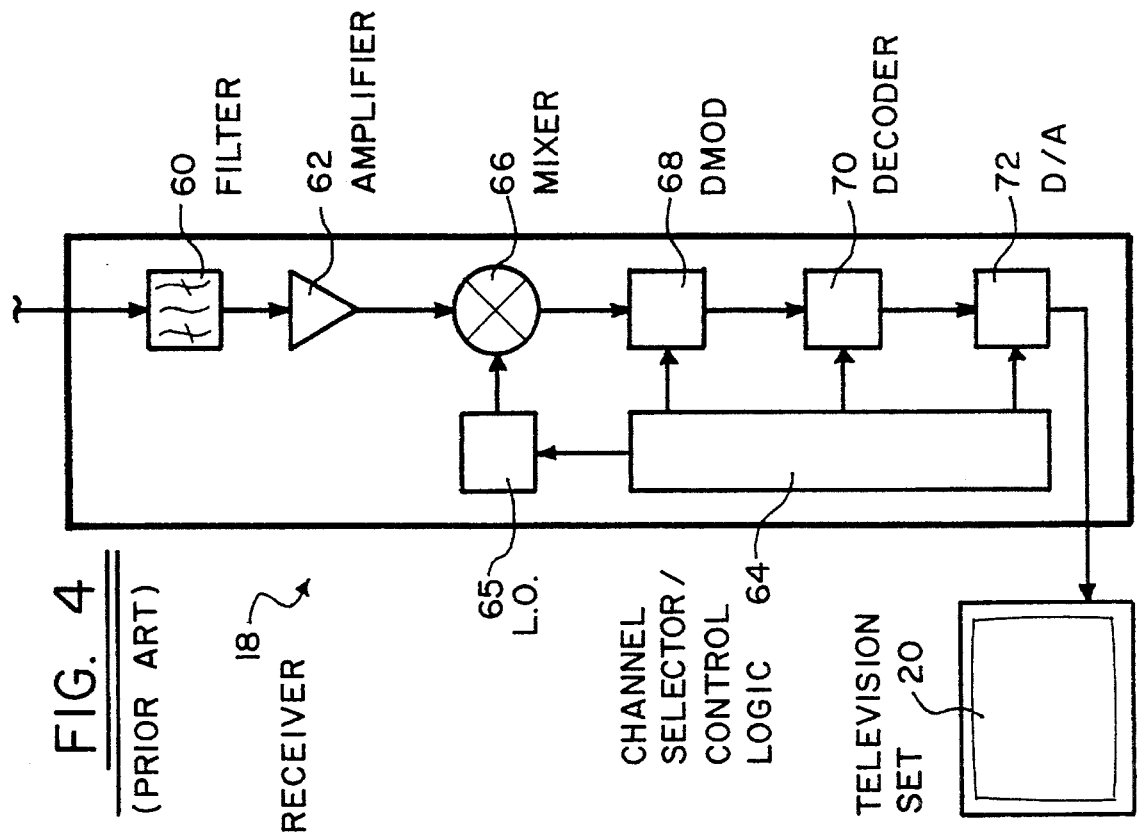
FIG. 4 is a diagrammatic representation showing a receiver and receiver output according to the invention.

FIG. 4 illustrates a DBS receiver/decoder 18 as employed according to the invention. The receiver 18 includes a band pass filter 60 and an additional amplifier 62. A channel selector/controller 64 controls a local oscillator 65 which in turn controls a mixer 66 connected in series with the signal path. A demodulator 68, a digital decoder 70, and a digital to analog converter 72 complete the circuitry required to decode the signal. Once fully decoded, the analog output from the receiver 18 represents an NTSC-television signal which can be received by the television set 20. The illustrated DBS receiver/decoder 18 operates under the control of the channel selector controller 64. In operation, a subscriber inputs a desired channel setting either manually or by hand-held remote (not shown) on the selector/controller 64 which causes the mixer 66 to select the desired carrier signal from the several carrier signals reaching the receiver/decoder 18. The demodulator 68 then produces a stream of digital signals from this single carrier which is then decoded by the decoder 70 to produce a digital signal for a desired channel. The digital to analog converter 72 converts this digital signal to the analog signal necessary to drive the television set 20.

Figure 5:
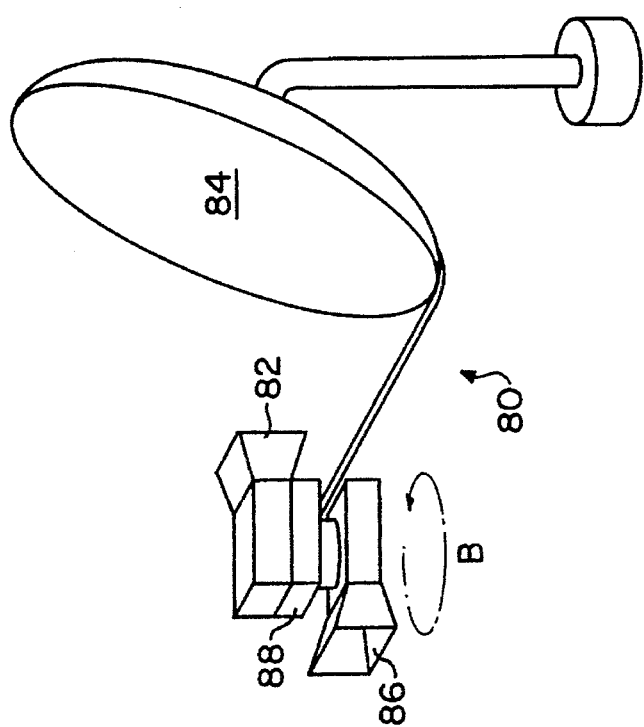
FIG. 5 is an isometric drawing of an alternate antenna structure embodying the principles of the invention.

FIG. 5 shows an alternative antenna structure 80 embodying the principles of the invention. In this form of the invention, the antenna structure 80 includes two separate feed-horns, a satellite feed-horn 82 for receiving reflected signals from the satellite dish 84 and a terrestrial feed-horn 86 for receiving signals directly from the terrestrial transmitter 14 (FIG. 1). Both feed-horns 82 and 86 are preferably connected to a single LNB 88 which may have two integrally formed probes (not shown), each probe extending into one of the feed-horn wave guides. The terrestrial feed-horn 86 preferably is pivotally connected to the LNB 88 and satellite feed-horn 82 so that it may be rotated as shown at arrow B for alignment with its receiving end best positioned for receiving signals from the local terrestrial transmitter 14.

Those skilled in the art will readily appreciate that there are a number of antenna types that may be employed as the first and second antennas according to the invention. For example, a circular wave guide could be used as the antenna for receiving the local channel signals from the terrestrial transmitter 14 and another circular wave guide could be used in place of the feed-horn in the dish-type satellite antenna. Alternatively two "patch" or flat plate antennas could also be used for both receiving the satellite channel signals and the local channel signals. Even a single flat plate antenna could be used for receiving the satellite signals and the local terrestrially transmitted signals if the flat plate were mounted so that its orientation could be changed to receive the desired signal. In this single flat plate antenna form of the invention an antenna such as that disclosed in U.S. Pat. Nos. 4,761,654 or 5,005,019 with an integrally formed LNB would be mounted so that it could pivot upwardly in position to receive signals from the satellite and downwardly until it extends generally vertically to receive the terrestrially transmitted signals. Additionally the flat plate would be capable of pivoting about its base to face the best direction for receiving the desired signals. This single movable antenna structure is equivalent to the first and second antennas set out in the following claims.

The operation in the invention and the method for providing local channel signals with direct broadcast satellite signals may now be described with reference to FIGS. 1–5. Referring particularly to FIG. 1, the method includes transmitting converted local signals from the terrestrial transmitter 14 at a terrestrial transmitter location. The converted local channel signals are in a first frequency band that itself is within a satellite frequency band in which signals are transmitted from a direct broadcast satellite 12. The method also includes receiving both the converted local channel signals and the direct broadcast satellite channel signals at a user location remote from the terrestrial transmitter 14. The method continues with the step of combining the local channel signals and the direct broadcast satellite channel signals on a single propagation path for the final step of processing in the receiver 18 to produce the desired television channel signal.

In a practical application of the invention, the terrestrial transmitter 14 would preferably be operated by a local service provider that does not itself provide programming. The operator of the terrestrial transmitter would then obtain local programming from local broadcasters. In this preferred form of the invention the method also includes receiving the local channel signals in their regular or initial broadcast frequency and translating the local channel signals into converted local channel signals in the first frequency band. The conversion process would include converting the local channel signals from an analog to a digital form that is acceptable to the DBS receiver. The step of transmitting the local channel signals would then comprise retransmitting the converted local signals to direct broadcast system subscribers.

The method of combining the local channel signals and direct broadcast satellite channel signals may be performed with any suitable combiner. For example, the combiner may be a stripline combiner 44 as shown in FIG. 3 or a directional coupler as described above. In any event, the output is the combined signal which appears to the DBS receiver just as it would have appeared had the signal actually been broadcast from the satellite. Thus, the invention provides the advantage that no additional receiver is required to receive local channel signals and the local programming is seamlessly combined with the regional or national satellite programming.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. An apparatus for simultaneously providing local originating channels along with direct broadcast satellite television channels transmitted from a satellite, the apparatus comprising:

(a) a terrestrial transmitter located at a terrestrial broadcasting location for transmitting converted local channel signals in a first frequency band, the first frequency band contained within a satellite broadcast frequency band;

(b) a first antenna located at a user location remote from the terrestrial broadcasting location for receiving from the terrestrial transmitter the converted local channel signals in the first frequency band;

(c) a second antenna at the user location for receiving from the satellite direct broadcast satellite television channel signals in the satellite broadcast frequency band;

(d) combining means at the user location for combining the converted local channel signals received by the first antenna and the direct broadcast satellite television signals received by the second antenna to form combined television signals in the satellite broadcast frequency band on a single signal path; and (e) signal processing means at the user location for receiving the combined television signals from the combining means and processing the combined television signals to produce a desired channel output signal.

2. The apparatus of claim 1 further comprising:

(a) a terrestrial receiver located at the terrestrial broadcasting location for receiving local channel signals; and (b) a signal converter located at the terrestrial broadcasting location for converting the local channel signals to converted local channel signals in the first frequency band.

3. The apparatus of claim 1 wherein the first antenna is selected from the group consisting of circular waveguide antennas, feed-horn antennas, flat plate antennas, slot antennas, dipole antennas, and multi-dipole antennas.

4. The apparatus of claim 1 wherein the second antenna comprises:

(a) at least one reflector for reflecting and concentrating the direct broadcast satellite television channel signals;

(b) a signal collector for collecting the direct broadcast satellite television channel signals concentrated by the reflector; and (c) an antenna probe extending into the signal collector for receiving the direct broadcast satellite television channel signals.

5. The apparatus of claim 4 wherein the signal collector is selected from the group consisting of feed-horn assemblies and circular wave guides.

6. The apparatus of claim 1 wherein the second antenna is a flat plate antenna.

7. The apparatus of claim 1 wherein the satellite broadcast frequency band has an approximate lower frequency limit of 12.2 Giga-Hertz and an approximate upper frequency limit of 12.7 Giga-Hertz.

8. The apparatus of claim 1 wherein the combining means comprises a stripline combiner mounted on a low noise block converter, the stripline combiner including:

(a) a first input connected to receive converted local channel signals from the first antenna;

(b) a second input connected to receive direct broadcast satellite television channel signals from the second antenna; and (c) an output connected to deliver the combined television signals to signal processing elements of the low noise block converter.

9. An apparatus for simultaneously receiving signals from both a satellite source and a terrestrial source, the apparatus comprising:

(a) a first antenna for receiving from a terrestrial transmitter converted local channel signals in a first frequency band, the first frequency band contained within a satellite broadcast frequency band;

(b) a second antenna for receiving from the satellite source direct broadcast satellite television channel signals in the satellite broadcast frequency band; and (c) combining means for combining the converted local channel signals received by the first antenna and the direct broadcast satellite television channel signals received by the second antenna to form combined television channel signals in the satellite broadcast frequency band on a single signal path.

10. The apparatus of claim 9 wherein the first antenna is selected from the group consisting of circular waveguide antennas, feed-horn antennas, flat plate antennas, slot antennas, dipole antennas, and multi-dipole antennas.

11. The apparatus of claim 9 wherein the second antenna comprises:

(a) at least one reflector for reflecting and concentrating the direct broadcast satellite television channel signals;

(b) a signal collector for collecting the direct broadcast satellite television channel signals concentrated by the reflector; and (c) an antenna probe extending into the signal collector for receiving the satellite television channel signals.

12. The apparatus of claim 11 wherein the signal collector is selected from the group consisting of feed-horn assemblies and circular wave guides.

13. The apparatus of claim 9 wherein the second antenna is a flat plate antenna.

14. The apparatus of claim 9 wherein the satellite broadcast frequency band has an approximate lower frequency limit of 12.2 Giga-Hertz and an approximate upper frequency limit of 12.7 Giga-Hertz.

15. The apparatus of claim 9 wherein the combining means comprises a stripline combiner mounted on a low noise block converter, the stripline combiner including:

(a) a first input connected to receive converted local channel signals from the first antenna;

(b) a second input connected to receive direct broadcast satellite television channel signals from the second antenna; and (c) an output connected to deliver the combined television channel signals to signal processing elements of the low noise block converter.

16. In a system for providing direct broadcast satellite television channels having a satellite transmitter for transmitting direct broadcast satellite television channel signals in a satellite broadcast frequency band, a satellite signal antenna for receiving direct broadcast satellite television channel signals at a user location, and signal processing means at the user location for receiving the direct broadcast satellite television channel signals and processing the signals to produce a desired channel output, the improvement comprising:

(a) a terrestrial transmitter for transmitting converted local channel signals in a first frequency band, the first frequency band contained within the satellite broadcast frequency band;

(b) a first antenna at the user location for receiving from the terrestrial transmitter the converted local channel signals in the first frequency band; and (c) combining means at the user location for combining the converted local channel signals received by the first antenna and the direct broadcast satellite television signals received by the second antenna to form combined television signals in the satellite broadcast frequency band on a single signal path for processing by the signal processing means.

17. The system of claim 16 wherein the combining means comprises a stripline combiner mounted on a low noise block converter, the stripline combiner including:

(a) a first input connected to receive converted local channel signals from the first antenna;

(b) a second input connected to receive direct broadcast satellite television channel signals from the second antenna; and (c) an output connected to deliver the combined television signals to signal processing elements of the low noise block converter.

18. A method for providing local originating channels along with direct broadcast satellite television channels transmitted from a satellite, the method comprising the steps of:

(a) transmitting converted local channel signals in a first frequency band from a terrestrial transmitter location, the first frequency band contained within a satellite broadcast frequency band;

(b) at a user location remote from the terrestrial transmitter location, receiving the converted local channel signals in the first frequency band;

(c) receiving at the user location direct broadcast satellite television channel signals in the satellite broadcast frequency band, the direct broadcast satellite television channel signals being transmitted from the satellite;

(d) combining the converted local channel signals and the direct broadcast satellite television signals to form combined television signals in the satellite broadcast frequency band on a single signal path; and (e) processing the combined signals to produce a desired channel output signal.

19. The method of claim 18 further comprising the steps of:

(a) receiving at the terrestrial transmitter location local channel signals; and (b) converting the local channel signals to converted local channel signals in the first frequency band.

20. The method of claim 18 wherein the step of combining the converted local channel signals and the direct broadcast satellite television signals to form the combined television signal is performed with a stripline combiner mounted on a low noise block converter and further including the step of:

(a) directing the combined television signals to signal processing elements of the low noise block converter.

21. An apparatus for simultaneously providing local originating channels, along with direct broadcast satellite television channels transmitted from a satellite, the apparatus comprising:

(a) a terrestrial transmitter located at a terrestrial broadcasting location for transmitting converted local channel signals in a first frequency band, the first frequency band contained within a satellite broadcast frequency band;

(b) an antenna located at a user location remote from the terrestrial broadcasting location for receiving from the terrestrial transmitter the converted local channel signals in the first frequency band when the antenna is oriented in a first position and for receiving from the satellite direct broadcast satellite television channel signals in the satellite broadcast frequency band when oriented in a second position;

(c) antenna orienting means connected to the antenna for enabling the antenna to move between the first position and the second position; and (d) signal processing means at the user location for receiving television signals from the antenna and processing the television signals to produce a desired channel output signal.

\* \* \* \* \*